US012803822B2

(12) United States Patent
Chen et al.

(10) Patent No.: US 12,803,822 B2
(45) Date of Patent: Nov. 17, 2026

(54) PHYSICALLY UNCLONABLE FUNCTION CODE GENERATING SYSTEM AND GENERATING METHOD

(71) Applicant: eMemory Technology Inc., Hsin-Chu (TW)

(72) Inventors: Lun-Chun Chen, Hsinchu County (TW); Tzu-Neng Lai, Hsinchu County (TW); Ping-Lung Ho, Hsinchu County (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 26 days.

(21) Appl. No.: 19/010,437

(22) Filed: Jan. 6, 2025

(65) Prior Publication Data

US 2025/0232066 A1 Jul. 17, 2025

Related U.S. Application Data

(60) Provisional application No. 63/620,725, filed on Jan. 12, 2024.

(51) Int. Cl.

| | |
|---|---|
| ***H04L 9/32*** | (2006.01) |
| ***G06F 21/75*** | (2013.01) |
| ***G11C 16/04*** | (2006.01) |
| ***G11C 16/14*** | (2006.01) |
| ***G11C 16/34*** | (2006.01) |

(Continued)

(52) U.S. Cl.
CPC ............ *H04L 9/3278* (2013.01); *G06F 21/75* (2013.01); *G11C 16/0475* (2013.01); *G11C 16/14* (2013.01); *G11C 16/3427* (2013.01); *H10B 43/10* (2023.02); *H10B 43/35* (2023.02); *H10D 30/696* (2025.01); *H10D 64/037* (2025.01); *H03K 19/003* (2013.01)

(58) Field of Classification Search
CPC ..................................................... H04L 9/3278
See application file for complete search history.

(56) References Cited

U.S. PATENT DOCUMENTS 9,613,714 B1 4/2017 Wong
10,439,829 B1 * 10/2019 Lin .................... G11C 13/0059

(Continued)

FOREIGN PATENT DOCUMENTS

CA 2952941 A1 7/2017
TW 202334973 A 9/2023

OTHER PUBLICATIONS

Office Action issued by Taiwan Intellectual Property Office on Jul. 21, 2026.

*Primary Examiner* — Bradley W Holder
(74) *Attorney, Agent, or Firm* — WPAT, PC

(57) ABSTRACT

A physically unclonable function (PUF) code generating method includes the following steps. In a step (a), M×N memory cells in a memory cell array of a non-volatile memory are controlled to have an identical storage state, wherein M and N are positive integers, and M×N is greater than 1. In a step (b), X memory cells are selected from the memory cell array multiple times, and a virtual array is established, wherein the virtual array contains plural electrical characteristic combinations, and X is a positive integer smaller than M×N. In a step (c), the plural electrical characteristic combinations are selected from the virtual array multiple times, and a multi-bit PUF code is generated.

5 Claims, 7 Drawing Sheets

(51) Int. Cl.

| | |
|---|---|
| ***H10B 43/10*** | (2023.01) |
| ***H10B 43/35*** | (2023.01) |
| ***H10D 30/69*** | (2025.01) |
| ***H10D 64/01*** | (2025.01) |
| *H03K 19/003* | (2006.01) |

(56) References Cited

U.S. PATENT DOCUMENTS

| | | | | |
|---|---|---|---|---|
| 10,623,192 | B2 | 4/2020 | Wang | |
| 10,649,735 | B2 | 5/2020 | Chen | |
| 10,700,878 | B1 * | 6/2020 | Ryu | G11C 13/004 |
| 11,050,575 | B2 | 6/2021 | Wu | |
| 11,145,344 | B1 | 10/2021 | Lu | |
| 2018/0337777 | A1 * | 11/2018 | Shieh | G06F 21/73 |
| 2021/0027814 | A1 * | 1/2021 | Mahatme | H04L 9/0866 |
| 2022/0045871 | A1 | 2/2022 | Juvekar | |

* cited by examiner

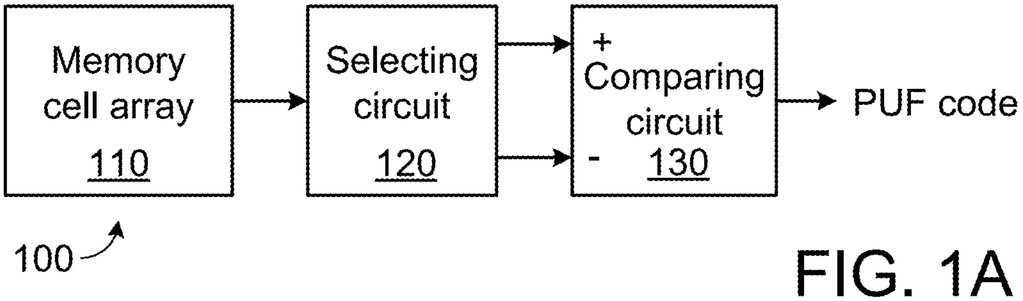

FIG. 1A

110

| | | |
|---|---|---|
| $A(I_A)$ | $B(I_B)$ | $C(I_C)$ |
| $D(I_D)$ | $E(I_E)$ | $F(I_F)$ |
| $G(I_G)$ | $H(I_H)$ | $I(I_I)$ |

(PUF array)

| | | | | | |
|---|---|---|---|---|---|
| $I_A, I_B$ | $I_A, I_C$ | $I_A, I_D$ | $I_A, I_E$ | $I_A, I_F$ | $I_A, I_G$ |
| $I_A, I_H$ | $I_A, I_I$ | $I_B, I_C$ | $I_B, I_D$ | $I_B, I_E$ | $I_B, I_F$ |
| $I_B, I_G$ | $I_B, I_H$ | $I_B, I_I$ | $I_C, I_D$ | $I_C, I_E$ | $I_C, I_F$ |
| $I_C, I_G$ | $I_C, I_H$ | $I_C, I_I$ | $I_D, I_E$ | $I_D, I_F$ | $I_D, I_G$ |
| $I_D, I_H$ | $I_D, I_I$ | $I_E, I_F$ | $I_E, I_G$ | $I_E, I_H$ | $I_E, I_I$ |
| $I_F, I_G$ | $I_F, I_H$ | $I_F, I_I$ | $I_G, I_H$ | $I_G, I_I$ | $I_H, I_I$ |
| $I_I, I_H$ | $I_I, I_G$ | $I_H, I_G$ | $I_I, I_F$ | $I_H, I_F$ | $I_G, I_F$ |
| $I_I, I_E$ | $I_H, I_E$ | $I_G, I_E$ | $I_F, I_E$ | $I_I, I_D$ | $I_H, I_D$ |
| $I_G, I_D$ | $I_F, I_D$ | $I_E, I_D$ | $I_I, I_C$ | $I_H, I_C$ | $I_G, I_C$ |
| $I_F, I_C$ | $I_E, I_C$ | $I_D, I_C$ | $I_I, I_B$ | $I_H, I_B$ | $I_G, I_B$ |
| $I_F, I_B$ | $I_E, I_B$ | $I_D, I_B$ | $I_C, I_B$ | $I_I, I_A$ | $I_H, I_A$ |
| $I_G, I_A$ | $I_F, I_A$ | $I_E, I_A$ | $I_D, I_A$ | $I_C, I_A$ | $I_B, I_A$ |

FIG. 1B

110

| | | |
|---|---|---|
| 25.2μA | 18.3μA | 20.5μA |
| 29.4μA | 15.8μA | 26.4μA |
| 18.7μA | 21.0μA | 23.6μA |

(PUF array)

| | | | | | |
|---|---|---|---|---|---|
| 1 | 1 | 0 | 1 | 0 | 1 |
| 1 | 1 | 0 | 0 | 1 | 0 |
| 0 | 0 | 0 | 0 | 1 | 0 |
| 1 | 0 | 0 | 1 | 1 | 1 |
| 1 | 1 | 0 | 0 | 0 | 0 |
| 1 | 1 | 1 | 0 | 0 | 0 |
| 1 | 1 | 1 | 0 | 0 | 0 |
| 1 | 1 | 1 | 1 | 0 | 0 |
| 0 | 0 | 0 | 1 | 1 | 0 |
| 1 | 0 | 1 | 1 | 1 | 1 |
| 1 | 0 | 1 | 1 | 0 | 0 |
| 0 | 1 | 0 | 1 | 0 | 0 |

FIG. 1C

PHYSICALLY UNCLONABLE FUNCTION CODE GENERATING SYSTEM AND GENERATING METHOD

This application claims the benefit of U.S. provisional application Ser. No. 63/620,725, filed Jan. 12, 2024, the subject matters of which are incorporated herein by references.

FIELD OF THE INVENTION

The present invention relates to a random number generator, and more particularly to a generating system and a generating method for a physically unclonable function (PUF) code.

BACKGROUND OF THE INVENTION

A physically unclonable function (PUF) technology is a novel method for protecting the data of a semiconductor chip. That is, the use of the PUF technology can prevent the data of the semiconductor chip from being stolen. In accordance with the PUF technology, the semiconductor chip is capable of providing a random code, which is referred as a physically unclonable function (PUF) code. This PUF code is used as a unique identity code (ID code) of the semiconductor chip to achieve the data protecting function.

Generally, the PUF technology acquires the unique PUF code of the semiconductor chip according to the manufacturing variation of the semiconductor chip. This manufacturing variation includes the semiconductor process variation. That is, even if the PUF semiconductor chip is produced by a precise manufacturing process, the PUF code cannot be duplicated. Consequently, the semiconductor chip using the PUF technology is suitably used in the applications with high security requirements.

For example, U.S. Pat. No. 9,613,714 B1 disclosed a one time programming memory cell and a memory cell array for a PUF technology and an associated random code generating method. The one time programming memory cell and the memory cell array are manufactured according to the semiconductor process variation. After a program action is performed, the memory cell has the unique PUF code.

SUMMARY OF THE INVENTION

An embodiment of the present invention provides a physically unclonable function (PUF) code generating method. The PUF code generating method includes steps of: (a) controlling M×N memory cells in a memory cell array of a non-volatile memory to have an identical storage state, wherein M and N are positive integers, and M×N is greater than 1; (b) collecting M×N electrical characteristics of the M×N memory cells, and calculating a reference electrical characteristic according to the M×N electrical characteristics; (c) selecting one of the M×N memory cells; (d) comparing an electrical characteristic of the selected memory cell with the reference electrical characteristic; (e) generating a one-bit PUF code according to a difference between the electrical characteristic of the selected memory cell and the reference electrical characteristic; and, (f) determining whether the step (c) needs to be performed repeatedly, wherein if the step (c) needs to be performed repeatedly, the step (c) is performed again to generate another one-bit PUF code, wherein if the step (c) does not need to be performed repeatedly, the another one-bit PUF code is not generated.

Another embodiment of the present invention provides a physically unclonable function (PUF) code generating method. The PUF code generating method includes steps of: (a) controlling M×N memory cells in a memory cell array of a non-volatile memory to have an identical storage state, wherein M and N are positive integers, and M×N is greater than 1; (b) selecting two memory cells from the memory cell array; (c) comparing two electrical characteristics of the two selected memory cells; (d) generating a one-bit PUF code according to a difference between the two electrical characteristics of the two selected memory cells; and, (e) determining whether the step (b) needs to be performed repeatedly, wherein if the step (b) needs to be performed repeatedly, the step (b) is performed again to generate another one-bit PUF code, wherein if the step (b) does not need to be performed repeatedly, the another one-bit PUF code is not generated, wherein the step (b) is performed at most $$P_2^{M\times N}$$

times, and the multi-bit PUF code has at most $$P_2^{M\times N}$$

bits.

Another embodiment of the present invention provides a physically unclonable function (PUF) code generating method. The PUF code generating method includes steps of: (a) controlling M×N memory cells in a memory cell array of a non-volatile memory to have an identical storage state, wherein M and N are positive integers, and M×N is greater than 1; (b) selecting X memory cells from the memory cell array at most Y times for generating at most (Y×Y!) electrical characteristic combinations, and establishing a virtual array according to the electrical characteristic combinations, wherein X is a positive integer smaller than M×N, and Y is equal to $$C_X^{M\times N};$$

and, (c) selecting the electrical characteristic combinations from the virtual array multiple times, and generating a multi-bit PUF code according to plural comparison results.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 1A is a schematic block diagram illustrating a PUF code generating system according to a first embodiment of the present invention;

FIG. 1B schematically illustrates a PUF code generating system with a 3×3 memory cell array;

FIG. 1C is a schematic implementation example of the PUF code generating system with the 3×3 memory cell array;

DETAILED DESCRIPTION OF PREFERRED EMBODIMENTS

Figure 1D:
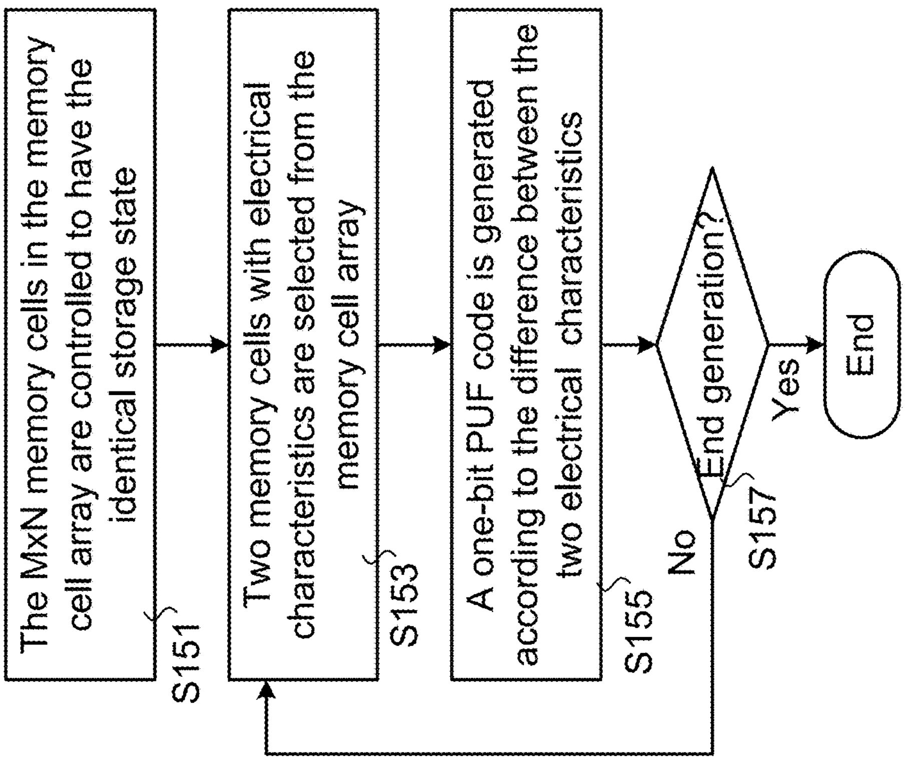
FIG. 1D is a flowchart of a first exemplary PUF code generating method for the PUF code generating system according to the first embodiment of the present invention.

Generally, a non-volatile memory includes plural memory cells, and the plural memory cells are collaboratively formed as a memory cell array. Furthermore, each memory cell includes a storage element. For example, the storage element is a floating gate transistor or an antifuse-type transistor.

Generally, the memory cell with a floating gate transistor may be served as a multi-time programmable memory cell (i.e., an MTP memory cell). Moreover, an MTP memory includes plural MTP memory cells. When a program action is performed, carriers are controlled to be injected into the floating gate of the floating gate transistor, and thus the memory cell is in a programmed state. When an erase action is performed, carriers are controlled to be ejected from the floating gate of the floating gate transistor, and thus the memory cell is in an erased state. When a read action is performed, the memory cell in the programmed state generates a larger cell current, and the memory cell in the erased state generates a smaller (i.e., nearly zero) cell current. Consequently, during the read action, the memory cell is judged to be in the programmed state or the erased state according to the magnitude of the cell current.

The non-volatile memory cell with the antifuse-type transistor may be served as a one-time programmable memory cell (i.e., an OTP memory cell). When the memory cell is not subjected to the program action, a gate dielectric layer of the antifuse-type transistor is not ruptured. Consequently, the memory cell is in an unprogrammed state or an unruptured state. When the memory cell is subjected to the program action, the gate dielectric layer of the antifuse-type transistor is ruptured. Consequently, the memory cell is in the programmed state or a ruptured state.

After the memory cell of the OTP memory becomes the programmed state, the memory cell cannot be restored to the unprogrammed state. When the read action is performed, the memory cell in the programmed state generates a larger cell current, and the memory cell in the unprogrammed state generates a smaller (i.e., nearly zero) cell current. Consequently, during the read action, the memory cell is judged to be in the programmed state or the unprogrammed state according to the magnitude of the cell current.

When the read action is performed on each of the above two types of memory cells, a sensing circuit (not shown) is used to determine the storage state of the memory cell. The sensing circuit receives the cell current and a reference current. In addition, the storage state of the memory cell is determined according to the magnitude of the cell current and the magnitude of the reference current. For example, if the cell current is higher than the reference current, the memory cell is determined to be in the programmed state. Whereas, if the cell current is lower than the reference current, the memory cell is determined to be in the unprogrammed state or the erased state.

In an embodiment, when the read action is performed, the cell current is also transmitted to a sensing node in the sensing circuit to charge the sensing node and a voltage increment at the sensing node is obtained. The sensing circuit determines the storage state of the memory cell according to the charging voltage increment of the sensing node. In case that the cell current is larger, the charging voltage increment of the sensing node is larger. In case that the cell current is smaller, the charging voltage increment of the sensing node is smaller (i.e., nearly zero). Consequently, the sensing circuit can determine the storage state of the memory cell according to the result of comparing the charging voltage increment with the reference voltage. For example, if the charging voltage increment is higher than the reference voltage, the memory cell is determined to be in the programmed state. Whereas, if the charging voltage increment is lower than the reference voltage, the memory cell is determined to be in the unprogrammed state or the erased state.

According to the above memory cell characteristics, the present invention utilizes a non-volatile memory to form a PUF code generating system. That is, the PUF code generating system of the present invention includes at least a non-volatile memory and generates a PUF code according to the memory cell characteristics in the non-volatile memory.

FIG. 1A is a schematic block diagram illustrating a PUF code generating system according to a first embodiment of the present invention. The PUF code generation system 100 includes a memory cell array 110, a selecting circuit 120 and a comparing circuit 130. The memory cell array 110 is a memory cell array of a non-volatile memory.

The memory cell array 110 includes M×N memory cells, wherein M and N are positive integers, and M×N is greater than 1. The storage states of the M×N memory cells are identical. For illustration, it is assumed that the M×N memory cells in the PUF code generation system 100 of the first embodiment are in the programmed state. It is noted that the implementation example of the present invention is not restricted. In case that the memory cells are MTP memory cells, the identical storage state of the M×N memory cells is the programmed state or the erased state.

The selecting circuit 120 selects two memory cells (i.e., a pair of memory cells) from the M×N memory cell array 110. In addition, the cell currents of the two memory cells are transmitted to the comparing circuit 130. According to the magnitudes of the two cell currents, the comparing circuit 130 determines a one-bit PUF code. Basically, there are a total of $$P_2^{M\times N}$$

ways to arbitrarily select (can be selected in a predetermined order) the memory currents of two memory cells from the M×N memory cell array 110. In other words, the M×N memory cell array 110 can generate a PUF code with at most $$P_2^{M\times N}$$

bits. In some embodiments, the two memory cells can be randomly selected by the selecting circuit 120.

In order to simply illustrate the PUF code generating system 100, the memory cell array 110 is a 3×3 memory cell array. FIG. 1B schematically illustrates a PUF code generating system with a 3×3 memory cell array. As shown in FIG. 1B, the 3×3 memory cell array 110 includes nine memory cells A, B, C, D, E, F, G, H and I. The storage states of the nine memory cells A, B, C, D, E, F, G, H and I are identical. For example, after the nine memory cells A, B, C, D, E, F, G, H and I are subjected to the program action, the nine memory cells A, B, C, D, E, F, G, H and I are in the programmed state.

As shown in FIG. 1B, the nine memory cell currents $I_A$, $I_B$, $I_C$, $I_D$, $I_E$, $I_F$, $I_G$, $I_H$ and $I_I$ corresponding to the nine memory cells A, B, C, D, E, F, G, H and I in the programmed state. Due to the manufacturing variation of the semiconductor chip, although the nine memory cells A, B, C, D, E, F, G, H and I are all programmed into the programmed state, the nine memory cells A, B, C, D, E, F, G, H and I will have different memory cell currents $I_A$, $I_B$, $I_C$, $I_D$, $I_E$, $I_F$, $I_G$, $I_H$ and $I_I$. In other words, the present invention utilizes the differences of the memory cell currents $I_A$, $I_B$, $I_C$, $I_D$, $I_E$, $I_F$, $I_G$, $I_H$ and $I_I$ for PUF technology.

The selecting circuit 120 selects two memory cells (i.e., a pair of memory cells) from the memory cell array. In addition, the cell currents from the two memory cells are respectively transmitted to the two input terminals of the comparing circuit 130. According to the comparison result, the comparing circuit 130 generates a one-bit PUF code. After plural pairs of cell currents from the memory cell array are selected by the selecting circuit 120 and inputted into the comparing circuit 130, the comparing circuit 130 generates plural one-bit PUF codes. The plural one-bit PUF codes are stored as a PUF array. Furthermore, the plural one-bit PUF codes can form a multi-bit PUF code.

Please refer to FIG. 1B again. The position (1,1) represents the position at the intersection of a first row from the top and a first column from the left in the PUF array, and the position (1,1) is the comparison result of the cell currents $I_A$ and $I_B$. The first input terminal (e.g., a positive input terminal) of the comparing circuit 130 receives the cell current $I_A$. The second input terminal (e.g., a negative input terminal) of the comparing circuit 130 receives the cell current $I_B$. Similarly, the position (1,2) represents the position at the intersection of the first row and a second column from the left in the PUF array, and the position (1,2) is the comparison result of the cell currents $I_A$ and $I_C$. Similarly, the position (1,3) in the PUF array is the comparison result of the cell currents $I_A$ and $I_D$. The rest may be deduced by analogy. In other words, after $$72(P_2^9)$$

pairs of cell currents are selected by the selecting circuit 120 and inputted into the comparing circuit 130, the comparing circuit 130 generates a 72-bit PUF code. The 72-bit PUF code is stored as the PUF array.

FIG. 1C is a schematic implementation example of the PUF code generating system with the 3×3 memory cell array. For example, in case that the nine memory cells in the memory cell array 110 are in the programmed state, the cell current $I_A$ of the memory cell A is 25.2 μA, the cell current $I_B$ of the memory cell B is 18.3 μA, the cell current $I_C$ of the memory cell C is 20.5 μA, the cell current $I_D$ of the memory cell D is 29.4 μA, the cell current $I_E$ of the memory cell E is 15.8 μA, the cell current $I_F$ of the memory cell F is 26.4 μA, the cell current $I_G$ of the memory cell G is 18.7 μA, the cell current $I_H$ of the memory cell H is 21.0 μA, and the cell current $I_I$ of the memory cell I is 23.6 μA.

After the plural pairs of cell currents from the selecting circuit 120 are inputted into the comparing circuit 130 in the sequence of FIG. 1B, the comparing circuit 130 generates the corresponding PUF code. These PUF code is stored as the PUF array shown in FIG. 1C. For example, since the cell current $I_A$ is higher than the cell current $I_B$, the comparing circuit 130 generates a one-bit PUF code "1" and stores this one-bit PUF code in the position (1,1) of the PUF array. Similarly, since the cell current $I_A$ is higher than the cell current $I_C$, the comparing circuit 130 generates a one-bit PUF code "1" and stores this one-bit PUF code in the position (1,2) of the PUF array. Since the cell current $I_A$ is lower than the cell current $I_D$, the comparing circuit 130 generates a one-bit PUF code "0" and stores this one-bit PUF code in the position (1,3) of the PUF array. The rest may be deduced by analogy. After the 72 pairs of cell currents are selected by the selecting circuit 120 and inputted into the comparing circuit 130, the comparing circuit 130 generates a 72-bit PUF code. The 72-bit PUF code is stored as the PUF array.

Obviously, in the PUF code generating system 100, the 3×3 memory cell array 110 (i.e., a small-size memory cell array) is expanded to a large-size PUF array to store the PUF code with more bits. In case that the memory cell array 110 in the PUF code generating system 100 includes M×N memory cells, the expanded PUF array generates the PUF code with at most $$P_2^{M\times N}$$

bits.

For example, in case that the memory cell array 110 includes 2×2 memory cells, the PUF code generating system 100 generates the PUF code with at most $$12(P_2^4)$$

bits. Similarly, in case that the memory cell array 110 includes 4×4 memory cells, the PUF code generating system 100 generates the PUF code with at most 240

$$240(P_2^{16})$$

bits. Similarly, in case that the memory cell array 110 includes 10×10 memory cells, the PUF code generating system 100 generates the PUF code with at most 9900

$$9900(P_2^{100})$$

bits.

It is noted that the sequence of selecting the plural pairs of memory cells by the selecting circuit 120 is not restricted. That is, the sequence of the PUF array shown in FIG. 1B is described herein for illustration. That is, in order to generate the PUF code, plural pairs of cell currents are selected by the selecting circuit 120 and inputted into the comparing circuit 130 in any sequence according to the practical requirements.

In the PUF code generating system 100 of the first embodiment, the M×N memory cell array 110 generates the PUF code with at most $$P_2^{M \times N}$$

bits. It is noted that numerous modifications and alterations may be made while retaining the teachings of the invention. For example, the above configuration may be used to generate the PUF code with fewer bits. In the example of FIG. 1B, at most 72 pairs of cell currents are selected by the selecting circuit 120 and sequentially inputted into the comparing circuit 130, and the comparing circuit 130 generates a 72-bit PUF code. According to the practical requirements, fewer pairs of cell currents are selected by the selecting circuit 120 and sequentially inputted into the comparing circuit 130. For example, only 36 pairs of cell currents are selected by the selecting circuit 120 and sequentially inputted into the comparing circuit 130, and the comparing circuit 130 generates a 36-bit PUF code.

In the above embodiment, the comparing circuit 130 generates the PUF code according to the result of comparing the cell currents. It is noted that numerous modifications and alterations may be made while retaining the teachings of the invention. As mentioned above, the charging voltage increment at the sensing node is related to the magnitude of the cell current. In some other embodiments, the selecting circuit 120 is specially designed. After a pair of memory cells is selected by the selecting circuit 120, the two charging voltage increments corresponding to the pair of memory cells are transmitted to the comparing circuit 130. According to the difference between the two charging voltage increments, the comparing circuit 130 generates a one-bit PUF code. After plural pairs of memory cells are sequentially selected by the selecting circuit 120 and the two charging voltage increments corresponding to each pair of memory cells are transmitted to the comparing circuit 130, the comparing circuit 130 generates a multi-bit PUF code.

FIG. 1D is a flowchart of a first exemplary PUF code generating method for the PUF code generating system according to the first embodiment of the present invention.

Firstly, a step S151 is performed to control the M×N memory cells in the memory cell array 110 to have the identical storage state, wherein M and N are positive integers, and M×N is greater than 1. In case that the memory cells are MTP memory cells, the M×N memory cells are controlled to be in the programmed state or the erased state. In case that the memory cells are OTP memory cells, the M×N memory cells are controlled to be in the programmed state or the unprogrammed state.

Then, the selecting circuit 120 selects two electrical characteristics from the memory cell array 110 (Step S153). That is, the selecting circuit 120 selects two electrical characteristics from a pair of memory cells in the memory cell array 110.

Then, the comparing circuit 130 generates a one-bit PUF code according to the difference between the two electrical characteristics of the pair of memory cells (Step S155).

For example, the electrical characteristics are cell currents or charging voltage increments when the read action is performed. Although the storage states of the M×N memory cells are identical, the electrical characteristics of the M×N memory cells are different because of the semiconductor process variation.

Then, in a step S157, the selecting circuit 120 determines whether the procedure of selecting the electrical characteristics is ended. If the judging condition of the step S157 is not satisfied, the PUF code is generated repeatedly. That is, the step S153 and the step S155 are repeatedly done to generate another one-bit PUF code. If the judging condition of the step S157 is satisfied, the comparing circuit 130 stops generating the PUF code. For example, the selecting circuit 120 selects plural pairs of memory cells from the memory cell array 110 in a specified sequence. The selecting circuit 120 can select $$P_2^{M \times N}$$

pairs of memory cells at most, and the comparing circuit 130 can generate the PUF code with $$P_2^{M \times N}$$

bits. In some embodiments, the selecting circuit 120 selects fewer pairs of memory cells, and thus a PUF code with fewer bits is generated. In other words, the selecting circuit 120 selects the memory cells from the memory cell array 110 in a specified sequence multiple times. After the electrical characteristics of the plural pairs of memory cells are transmitted to the comparing circuit 130, the comparing circuit 130 generates a multi-bit PUF code.

In some other embodiments, the PUF array is located outside the PUF code generating system. That is, the PUF code generating system is not equipped with the PUF array. The multi-bit PUF code from the comparing circuit 130 is transmitted to another target circuit (not shown). The PUF array is included in the target circuit for receiving the PUF code from the comparing circuit 130. The PUF code is then stored in the PUF array.

However, in some situations, the comparing circuit 130 is possibly suffered from misjudgment in the step S155. Under this circumstance, a step of judging whether the one-bit PUF code is discarded may be optionally performed. For example, if there is a tiny difference between the two electrical characteristics, the misjudgment of the comparing circuit 130 possibly occurs.

For example, as shown in FIG. 1C, the position (3,1) in the PUF array is related to the memory cell B and the memory cell G. If the selecting circuit 120 selects the memory cell B and the memory cell G and the cell current $I_B$ (18.3 μA) and the cell current $I_G$ (18.7 μA) are transmitted to the comparing circuit 130. Since the difference between the cell current $I_B$ and the cell current $I_G$ is tiny, it is difficult for the comparing circuit 130 to accurately determine the one-bit PUF code. Under this circumstance, the PUF code may be selectively discarded.

Figure 1E:
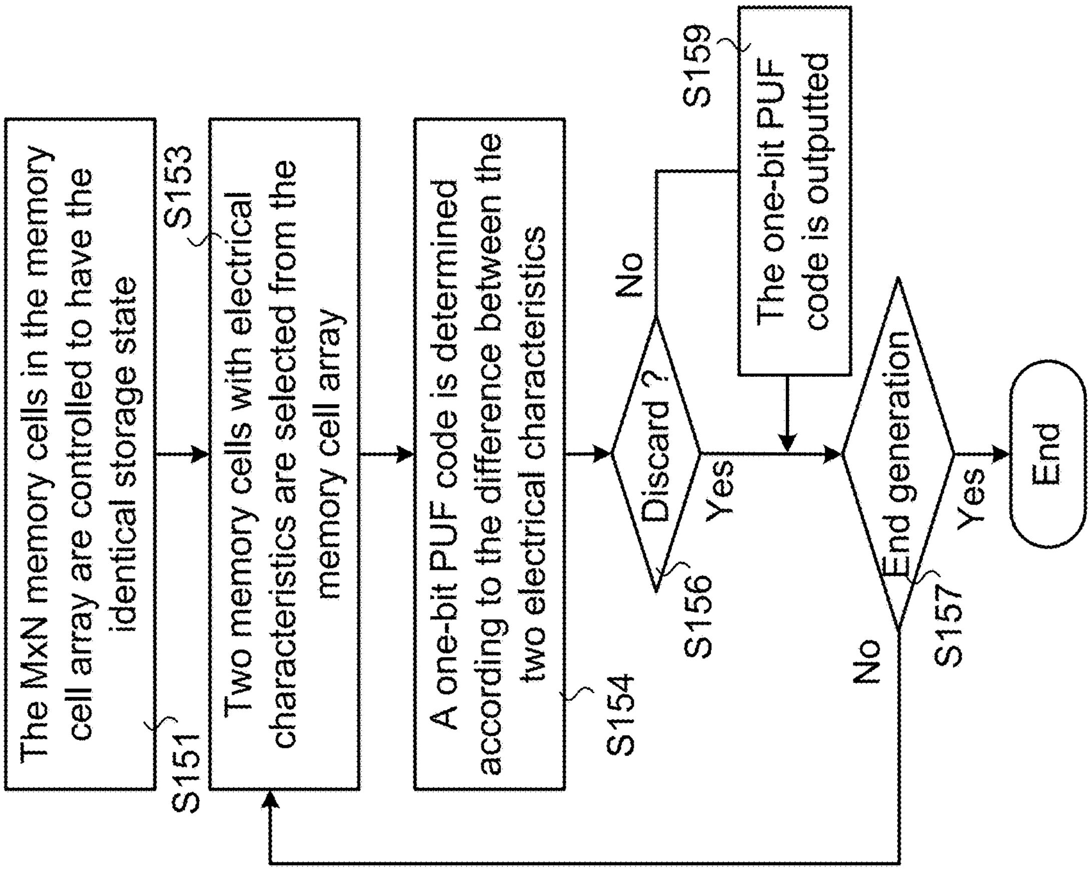
FIG. 1E is a flowchart of a second exemplary PUF code generating method for the PUF code generating system according to the first embodiment of the present invention.

FIG. 1E is a flowchart of a second exemplary PUF code generating method for the PUF code generating system according to the first embodiment of the present invention. In comparison with the flowchart of FIG. 1D, the PUF code generating method further includes a step S156 and a step S159 to judge whether the one-bit PUF code is discarded. After the step S153, the comparing circuit 130 determines a one-bit PUF code according to the difference between the electrical characteristics of the pair of memory cells (Step S154). Then, the comparing circuit 130 determines whether the one-bit PUF code is discarded (Step S156). If the judging condition of the step S156 is satisfied, the one-bit PUF code is discarded and not outputted from the comparing circuit 130. Whereas, if the judging condition of the step S156 is not satisfied, the one-bit PUF code will be outputted from the comparing circuit 130 (Step S519).

According to the practical requirements, there are many ways for the comparing circuit 130 to determine whether to discard the PUF code. For example, a difference of the two cell currents and a threshold value are used as the judging condition. If the difference between the two cell currents received by the comparing circuit 130 is lower than a threshold value (e.g., 0.5 μA), the judging condition is satisfied and the comparing circuit 130 will discard the one-bit PUF code. If the difference between the two memory cell currents received by the comparing circuit 130 is higher than the threshold value (e.g., 0.5 μA), the judging condition is not satisfied and the comparing circuit 130 will not discard the one-bit PUF code.

In another embodiment, the two outputs of comparing circuit 130 are used as the judging condition. The two cell currents are respectively inputted into different input terminals of the comparing circuit 130, and the comparing circuit 130 determines whether the one-bit PUF code is discarded according to the two outputs. For example, in the first time, the first input terminal of the comparing circuit 130 receives a first cell current, the second input terminal of the comparing circuit 130 receives a second cell current, and the output terminal of the comparing circuit 130 generates a first logic level. In the second time, the first input terminal of the comparing circuit 130 receives the second cell current, the second input terminal of the comparing circuit 130 receives the first cell current, and the output terminal of the comparing circuit 130 generates a second logic level. If the first logic level generated by the comparing circuit 130 in the first time and the second logic level generated by the comparing circuit 130 in the second time are complementary to each other, the judging condition is not satisfied and the comparing circuit 130 will not discard the one-bit PUF code. Whereas, if the first logic level generated by the comparing circuit 130 in the first time and the second logic level generated by the comparing circuit 130 in the second time are identical, the judging condition is satisfied and the comparing circuit 130 will discard the one-bit PUF code.

As known, the PUF code is a random code. Consequently, the steps S156 and S159 in FIG. 1E for judging whether the PUF code is discarded may be omitted. That is, the flowchart in FIG. 1D for generating the PUF code is feasible. In a variant example, the step S155 of FIG. 1D is modified. For example, the one-bit PUF code is generated according to the difference between the two electrical characteristics of the pair of memory cells.

In order to increase the randomness of the PUF code, the PUF code generation system 100 can be further modified.

Figure 2A:
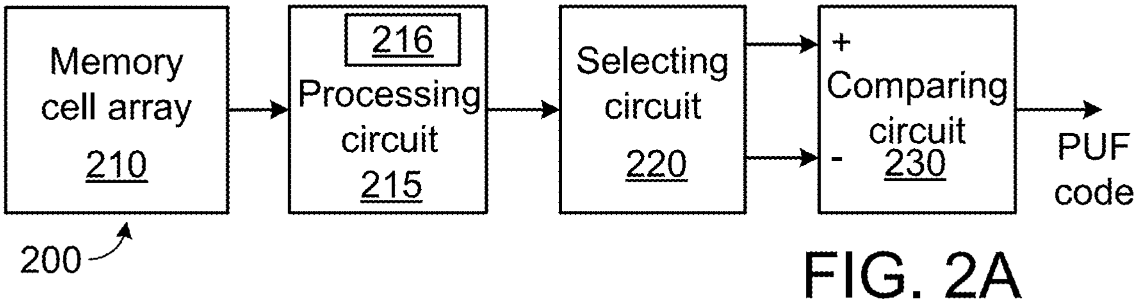
FIG. 2A is a schematic block diagram illustrating a PUF code generating system according to a second embodiment of the present invention.

FIG. 2A is a schematic block diagram illustrating a PUF code generating system according to a second embodiment of the present invention. The PUF code generation system 200 includes a memory cell array 210, a processing circuit 215, a selecting circuit 220 and a comparing circuit 230.

The memory cell array 210 includes M×N memory cells, wherein M and N are positive integers, and M×N is greater than 1. The storage states of the M×N memory cells are identical. The memory cell array 210 is a memory cell array of a non-volatile memory.

In this embodiment, X electrical characteristics are selected from M×N electrical characteristics by the processing circuit 215 and at least two of the X electrical characteristics are combined as an electrical characteristic combination, wherein X is a positive integer less than M×N and X is greater than or equal to 2. The electrical characteristics are cell currents or charging voltage increments. Consequently, Y electrical characteristic combinations can be selected by the processing circuit 215, wherein $$Y = C_X^{M?N}.$$

The Y electrical characteristic combinations can be arranged in a total of (Y!) different arrangements. That is, after multiple selections, the processing circuit 215 can obtain at most Y×(Y!) electrical characteristic combinations. In addition, these electrical characteristic combinations are stored as a virtual array 216.

The processing circuit 215 has a memory that can form a virtual array 216 of a size Y×(Y!). That is, the memory includes Y×(Y!) storage units. Each storage unit can store one electrical characteristic combination. The Y×(Y!) storage units can store a total of Y×(Y!) electrical characteristic combinations and form the virtual array 216.

Like the first embodiment, the selecting circuit 220 selects two storage units (i.e., a pair of storage units) from the Y×(Y!) virtual array 216. In addition, the electrical characteristic combinations of the two storage units are transmitted to the comparing circuit 230. According to the magnitudes of the two electrical characteristic combinations, the comparing circuit 230 determines a one-bit PUF code. Basically, there are a total of $$P_2^Z$$

ways to arbitrarily select the two electrical characteristic combinations from the Y×(Y!) virtual array 216, wherein Z=Y×(Y!). That is, in the M×N memory cell array 210, the processing circuit 215 can form the Y×(Y!) virtual array 216 at most, and the comparing circuit 230 can generate a PUF code with at most $$P_2^Z$$

bits, wherein $$Y = C_X^{M?N}, Z = Y \times (Y!).$$

Figure 2B:
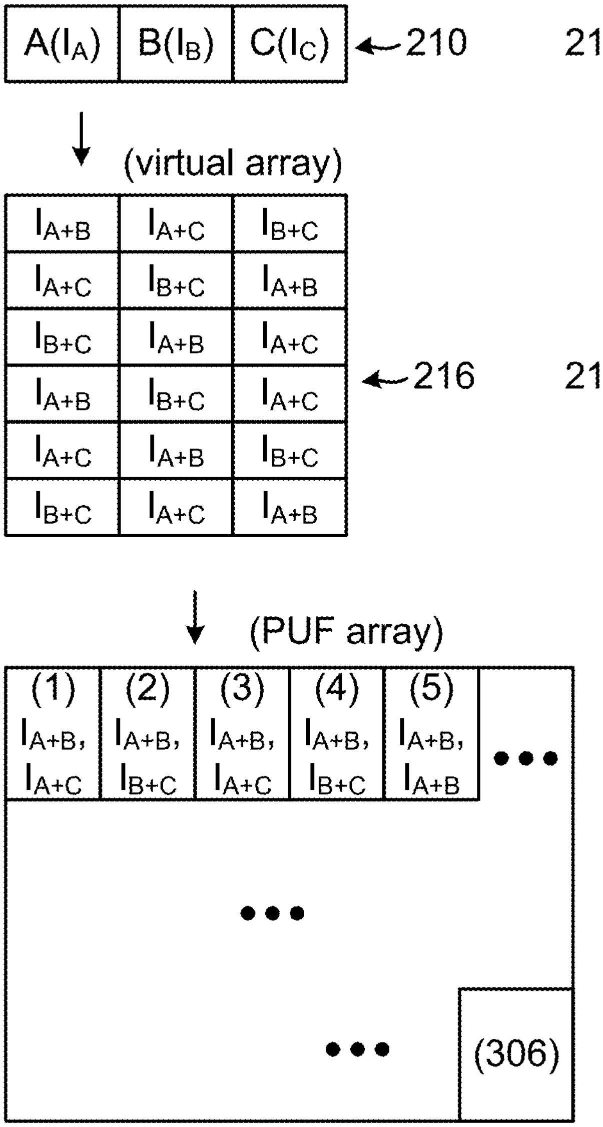
FIG. 2B schematically illustrates a PUF code generating system with a 3×1 memory cell array.

In order to simply illustrate the PUF code generating system 200, the memory cell array 210 is a 3×1 memory cell array. FIG. 2B schematically illustrates a PUF code generating system with a 3×1 memory cell array. As shown in FIG. 2B, the 3×1 memory cell array 210 includes three memory cells A, B and C. The storage states of the three memory cells A, B and C are identical. For example, after the three memory cells A, B and C are subjected to the program action, the three memory cells A, B and C are in the programmed state.

As shown in FIG. 2B, the cell current of the memory cell A in the programmed state is $I_A$, the cell current of the memory cell B in the programmed state is $I_B$, and the cell current of the memory cell C in the programmed state is $I_C$. Although the storage states of the three memory cells A, B and C are identical, the cell currents $I_A$, $I_B$ and $I_C$ of the three memory cells A, B and C are different because of the semiconductor process variation. That is, the difference between the current cells can be applied to the PUF technology. Similarly, the difference between the charging voltage increments can be applied to the PUF technology.

As shown in FIG. 2B, the cell current of the memory cell A in the programmed state is $I_A$, the cell current of the memory cell B in the programmed state is $I_B$, and the cell current of the memory cell C in the programmed state is $I_C$. In an embodiment, two cell currents are arbitrarily selected by the processing circuit 215 and added as an electrical characteristic combination (i.e., X=2). For example, the electrical characteristic combination $I_{A+B}$ represents the sum of the cell current $I_A$ of the memory cell A and the cell current $I_B$ of the memory cell B. Consequently, the processing circuit 215 obtains three electrical characteristic combinations $I_{A+B}$, $I_{A+C}$ and $I_{B+C}$. That is, $$Y = C_X^{M \times N} = C_2^{3 \times 1} = 3.$$

In some embodiments, X can be greater than 2.

The processing circuit 215 further arranges the three electrical characteristic combinations into six different (3!=6) arrangements. In the virtual array 216 shown in FIG. 2B, the six arrangements include [($I_{A+B}$), ($I_{A+C}$), ($I_{B+C}$)], [($I_{A+C}$), ($I_{B+C}$), ($I_{A+B}$)], [($I_{B+C}$), ($I_{A+B}$), ($I_{A+C}$)], [($I_{A+B}$), ($I_{B+C}$), ($I_{A+C}$)], [($I_{A+C}$), ($I_{A+B}$), ($I_{B+C}$)] and [($I_{B+C}$), ($I_{A+C}$), ($I_{A+B}$)] sequentially. After multiple selections, the processing circuit 215 obtains 3×6 (Y×Y!) electrical characteristic combinations and generates the virtual array 216 with a size of 3×6. In other words, the 18 storage units of the processing circuit 215 can store a total of 18 electrical characteristic combinations and form the virtual array 216.

Figure 2C:
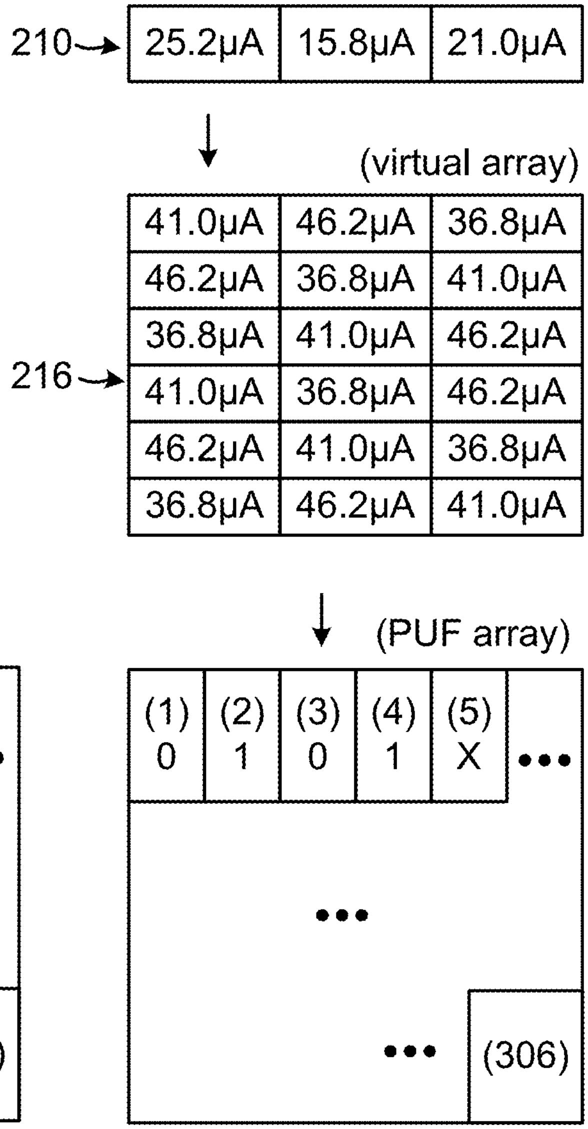
FIG. 2C is a schematic implementation example of the PUF code generating system with the 3×1 memory cell array.

It is noted that the size of the virtual array 216 is not restricted. As shown in FIG. 2C, the virtual array 216 with the largest size of 3×6. Actually, the processing circuit 215 can establish the virtual array 216 with the desired size according to the practical requirements. For example, the processing circuit 215 can establish a 3×3 virtual array 216.

That is, the selection number and the size of the virtual array 216 may be determined according to the practical requirements.

Like the first embodiment, the selecting circuit 220 selects a pair of storage units from the 3×6 storage units. In addition, the two electrical characteristic combinations from the pair of storage units are respectively transmitted to the two input terminals of the comparing circuit 230. According to the comparison result about the two electrical characteristic combinations, the comparing circuit 230 generates a one-bit PUF code. After plural pairs of electrical characteristic combinations from the virtual array 216 are selected by the selecting circuit 220 and inputted into the comparing circuit 230, the comparing circuit 230 generates a plurality of one-bit PUF codes. Then, the multi-bit PUF code is stored as a PUF array.

Please refer to FIG. 2B again. The position (1) in the PUF array is the comparison result of the electrical characteristic combinations $I_{A+B}$ and $I_{A+C}$. For example, the first input terminal (e.g., a positive input terminal) of the comparing circuit 230 receives the electrical characteristic combination $I_{A+B}$, and the second input terminal (e.g., a negative input terminal) of the comparing circuit 230 receives the electrical characteristic combination $I_{A+C}$. Similarly, the position (2) in the PUF array is the comparison result of the electrical characteristic combinations $I_{A+B}$ and $I_{B+C}$. Similarly, the position (3) in the PUF array is the comparison result of the electrical characteristic combinations $I_{A+B}$ and $I_{A+C}$. The rest may be deduced by analogy. In other words, after at most 306

$$306\left(P_2^{18}\right)$$

pairs of electrical characteristic combinations are selected by the selecting circuit 220 and inputted into the comparing circuit 230, the comparing circuit 230 generates a 306-bit PUF code. The 306-bit PUF code is stored as the PUF array.

The position (5) in the PUF array is the comparison result of the electrical characteristic combinations $I_{A+B}$ and $I_{A+B}$. Since it is impossible to predict what the PUF code generated by the comparing circuit 230 will be, the PUF code is marked with “X”. Of course, the comparing circuit 230 may selectively discard the one-bit PUF code.

FIG. 2C is a schematic implementation example of the PUF code generating system with the 3×1 memory cell array.

For example, in case that the three memory cells in the memory cell array 210 are in the programmed state, the cell current $I_A$ of the memory cell A is 25.2 μA, the cell current $I_B$ of the memory cell B is 15.8 μA, and the cell current $I_C$ of the memory cell C is 21.0 μA. In an embodiment, two cell currents are arbitrarily selected by the processing circuit 215 and added as a electrical characteristic combination Consequently, the processing circuit 215 obtains three electrical characteristic combinations 41.0 μA ($I_{A+B}$), 46.2 μA ($I_{A+C}$) and 26.8 μA ($I_{B+C}$). That is, $$Y = C_X^{M \times N} = C_2^{3 \times 1} = 3.$$

The processing circuit 215 further arranges the three electrical characteristic combinations into six different (3!=6) arrangements in the sequence of FIG. 2B. The six different (3!=6) arrangements are shown in FIG. 2C. After multiple selections, the processing circuit 215 obtains 3×6 electrical characteristic combinations and generates the virtual array 216 with a size of 3×6.

Then, the selecting circuit 220 selects a pair of storage units from the 3×6 storage units. In addition, the two electrical characteristic combinations from the pair of storage units are respectively transmitted to the two input terminals of the comparing circuit 230. According to the comparison result about the two electrical characteristic combinations, the comparing circuit 230 generates a one-bit PUF code. After plural pairs of electrical characteristic combinations from the virtual array are selected by the selecting circuit 220 and inputted into the comparing circuit 230, the comparing circuit 230 generates a plurality of one-bit PUF codes. Then, the multi-bit PUF code is stored as a PUF array.

Please refer to FIG. 2C. Since the electrical characteristic combination 41.0 μA is lower than the electrical characteristic combination 46.2 μA, the comparing circuit 230 generates a one-bit PUF code "0" and stores this one-bit PUF code in the position (1) of the PUF array. Since the electrical characteristic combination 41.0 μA is lower than the electrical characteristic combination 36.8 μA, the comparing circuit 230 generates a one-bit PUF code "1" and stores this one-bit PUF code in the position (2) of the PUF array. Since the electrical characteristic combination 41.0 μA is lower than the electrical characteristic combination 46.2 μA, the comparing circuit 230 generates a one-bit PUF code "0" and stores this one-bit PUF code in the position (3) of the PUF array. The rest may be deduced by analogy. After 306 pairs of electrical characteristic combinations are selected by the selecting circuit 220 and inputted into the comparing circuit 230, the comparing circuit 230 generates a 306-bit PUF code. The 306-bit PUF code is stored as the PUF array.

Obviously, in the PUF code generating system 200, the 3×1 memory cell array 210 (i.e., a small-size memory cell array) is expanded to a large-size PUF array to store the PUF code with more bits. For example, in case that the memory cell array 210 includes 10 memory cells and one electrical characteristic combination is the combination of three cell currents, i.e., X=3 and $$Y = C_3^{10} = 120,$$

the processing circuit 215 in the PUF code generating system 200 can generate the virtual array 216 with the largest size of 120×(120!). That is, the virtual array 216 can store 120×(120!) electrical characteristic combinations. In addition, the comparing circuit 230 can generate the PUF code with the largest bit numbers $$\left(P_2^{120\times(120!)}\right).$$

The multi-bit PUF code is stored as the PUF array.

It is noted that the sequence of selecting the plural pairs of memory cells by the selecting circuit 220 is not restricted. Moreover, the number of electrical characteristic combinations to be determined by the processing circuit 215 is not restricted. That is, the size of the virtual array 216 may be properly modified according to the practical requirements. It is noted that numerous modifications and alterations may be made while retaining the teachings of the invention. For example, the above configuration may be used to generate the PUF code with fewer bits. The electrical characteristic combination is the combination of plural cell currents or the combination of the charging voltage increments of plural memory cells.

Figure 2D:
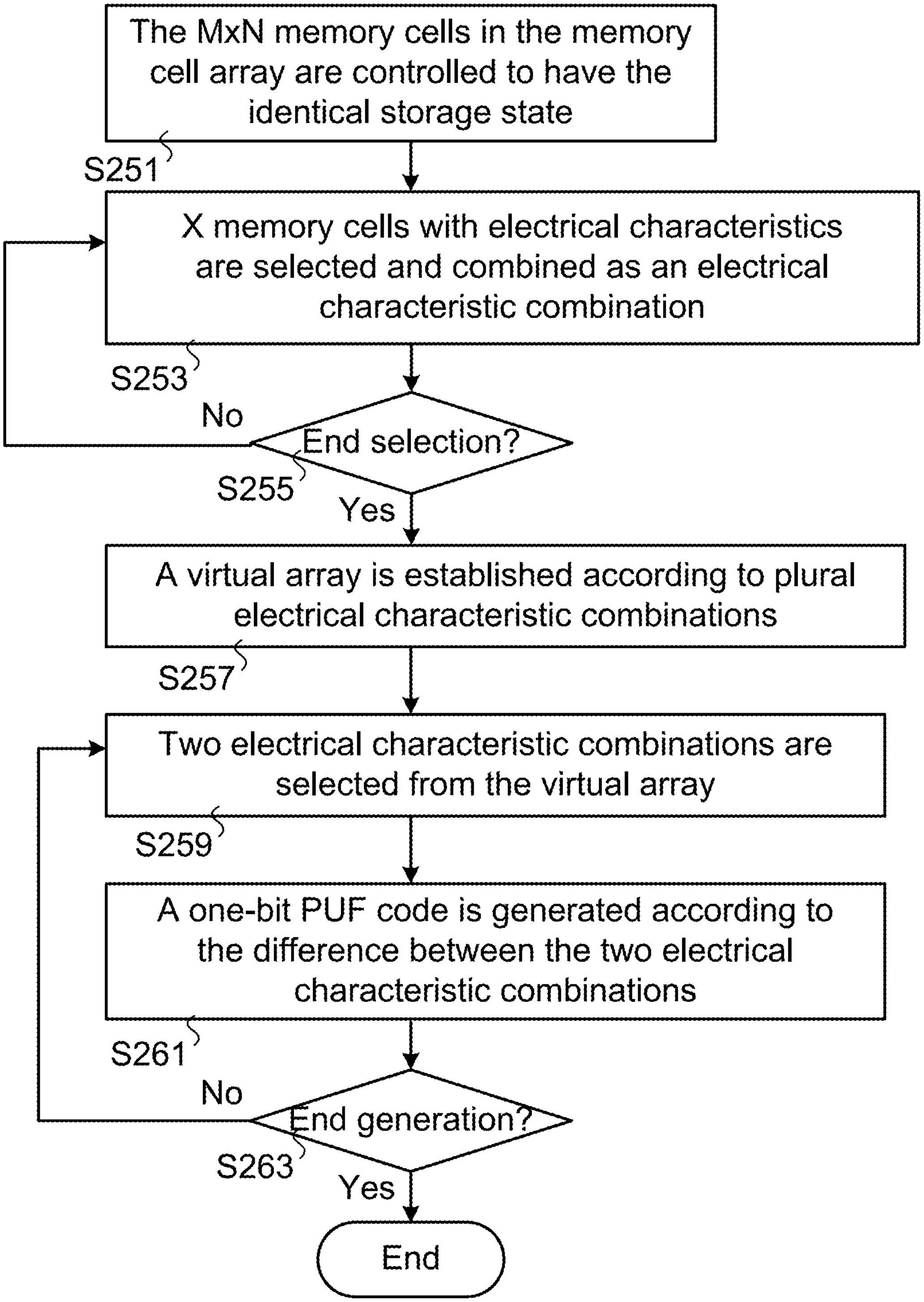
FIG. 2D is a flowchart of an exemplary PUF code generating method for the PUF code generating system according to the second embodiment of the present invention.

FIG. 2D is a flowchart of an exemplary PUF code generating method for the PUF code generating system according to the second embodiment of the present invention.

Firstly, a step S251 is performed to control the M×N memory cells in the memory cell array 210 to have the identical storage state, wherein M and N are positive integers, and M×N is greater than 1.

Then, X memory cells from the memory cell array 210 are selected and the electrical characteristics of the selected X memory cells are combined as an electrical characteristic combination by the processing circuit 215 (Step S253).

Then, a step S255 is performed to determine whether the procedure of selecting the natural characteristics is ended. If the judging condition of the step S255 is not satisfied, the step S253 is repeatedly done. If the judging condition of the step S255 is satisfied, the processing circuit 215 establishes a virtual array according to the collected plural electrical characteristic combinations (step S257). In an embodiment, the selecting circuit 220 determines whether the procedure of combining the electrical characteristics is ended. For example, after the processing circuit 215 collects an enough number of electrical characteristic combinations, the processing circuit 215 ends the procedure of selecting the electrical characteristics. Alternatively, after the processing circuit 215 collects the largest number (Y×Y!) of electrical characteristic combinations, the processing circuit 215 ends the procedure of selecting the electrical characteristics and establishes a virtual array 216, wherein $$Y = C_X^{M\times N}.$$

Then, the selecting circuit 220 selects two electrical characteristic combinations from the virtual array 216 (step S259).

Then, the comparing circuit 230 generates a one-bit PUF code according to the difference between the two electrical characteristic combinations (Step S261).

For example, the electrical characteristic combination is the sum of X cell currents or the sum of X charging voltage increments when the read action is performed. Although the storage states of the M×N memory cells are identical, the electrical characteristics and the electrical characteristic combinations of the M×N memory cells are different because of the semiconductor process variation. That is, the difference between the electrical characteristics and the difference between the electrical characteristic combinations can be applied to the PUF technology.

Then, in a step S263, the selecting circuit 220 determines whether the procedure of selecting two electrical characteristics combinations is ended. If the judging condition of the step S263 is not satisfied, the PUF code is generated repeatedly. That is, the step S259 and S261 are repeatedly done.

If the judging condition of the step S263 is satisfied, the comparing circuit 230 stops generating the PUF code. In an embodiment, the selecting circuit 220 determines whether the procedure of selecting two electrical characteristics combinations is ended. For example, after the selecting circuit 220 selects an enough number of electrical characteristic combinations, the selecting circuit 220 ends the selection. Alternatively, after the selecting circuit 220 performs the largest number $$\left(P_2^{Y\times(Y!)}\right)$$

of selections, the processing circuit 215 ends the selections. Under this circumstance, the comparing circuit 230 generate the PUF code with at most $$\left(P_2^{Y\times(Y!)}\right)$$

bits.

In the process of the second embodiment, the operation of the step S261 can be referred to the flowchart of FIG. 1D or FIG. 1E. For example, in case that the discard judgment is not performed, the one-bit PUF code is outputted directly. Alternatively, the discard judgment is performed to determine whether the one-bit PUF code is discarded.

In the first embodiment, the selecting circuit 120 selects two electrical characteristics to the comparing circuit and generates a one-bit PUF code. In the second embodiment, the selecting circuit 220 selects a pair of electrical characteristic combinations to the comparing circuit 230 and generates a one-bit PUF code. Of course, the operations of the selecting circuits 120 and 220 in the first and second embodiments may be modified.

Figure 3B:
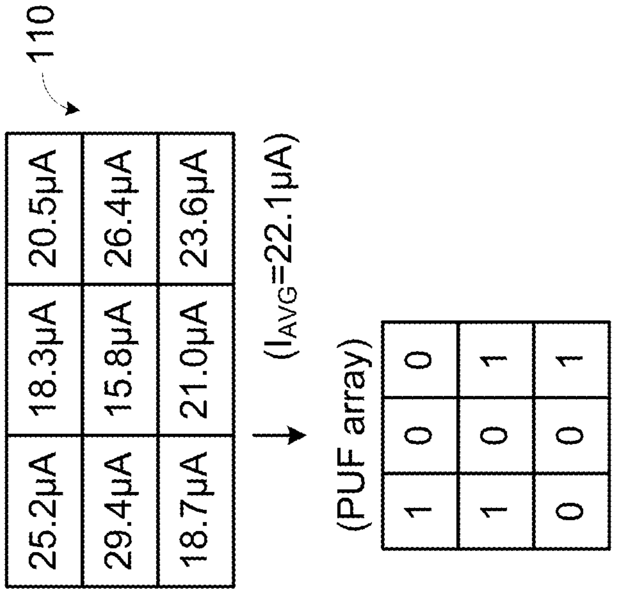
FIG. 3B is a schematic implementation example of the PUF code generating system with the 3×3 memory cell array.
Figure 3A:
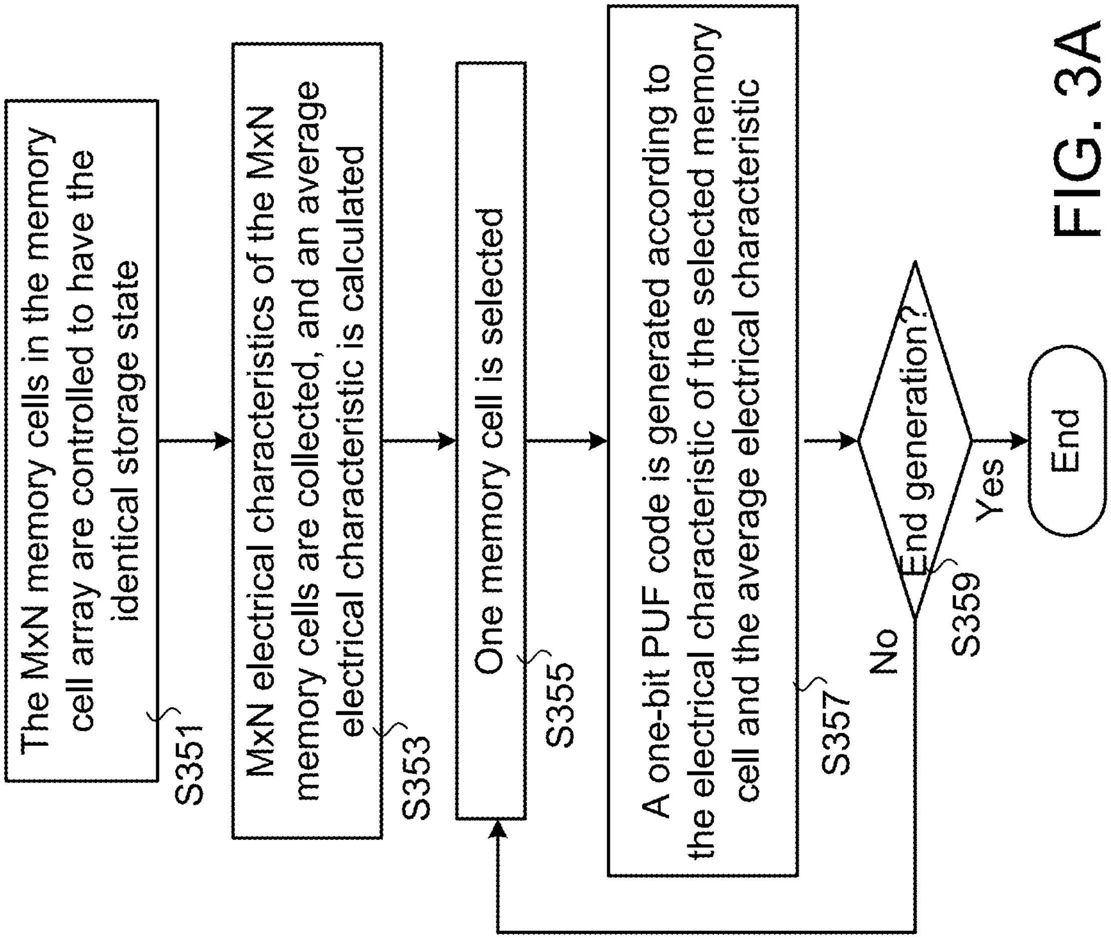
FIG. 3A is a flowchart of a third exemplary PUF code generating method for the PUF code generating system according to the first embodiment of the present invention.

FIG. 3A is a flowchart of a third exemplary PUF code generating method for the PUF code generating system according to the first embodiment of the present invention. The PUF code generating method of this embodiment is applied to the PUF code generating system 100 shown in FIG. 1A. The architecture of the PUF code generation system 100 will not be redundantly described herein.

Firstly, a step S351 is performed to control the M×N memory cells in the memory cell array 110 to have the identical storage state, wherein M and N are positive integers, and M×N is greater than 1.

Then, the selecting circuit 120 collects M×N electrical characteristics of the M×N memory cells and calculates a reference electrical characteristic (Step S353). The reference electrical characteristic can be an average electrical characteristic or a median electrical characteristic. In S353 and S357 of FIG. 3A, the average electrical characteristic will be used as the reference electrical characteristic and the present invention will be further explained.

Then, the selecting circuit 120 selects one memory cell (Step S355). In addition, the electrical characteristic of the selected memory cell and the average electrical characteristic are transmitted to the comparing circuit 130.

Then, the comparing circuit 130 generates a one-bit PUF code according to the selected electrical characteristic and the average electrical characteristic (Step S357).

Then, in a step S359, the selecting circuit 120 determines whether the procedure of selecting the electrical characteristics is ended. If the judging condition of the step S359 is not satisfied, the PUF code is generated repeatedly. That is, the step S355 and the step S357 are repeatedly done. If the judging condition of the step S359 is satisfied, the comparing circuit 130 stops generating the PUF code.

That is, the selecting circuit 120 selects plural memory cells from the memory cell array 110 in multiples times in a specified sequence. After the electrical characteristics of the plural memory cells are transmitted to the comparing circuit 130, the comparing circuit 130 generates a multi-bit PUF code according to the comparison results of comparing the electrical characteristics with the average electrical characteristic.

In the process of the second embodiment, the operation of the step S357 can be referred to the flowchart of FIG. 1D or FIG. 1E. For example, in case that the discard judgment is not performed, the one-bit PUF code is outputted directly. Alternatively, the discard judgment is performed to determine whether the one-bit PUF code is discarded.

The operations of the PUF code generating method of this embodiment will be illustrated with reference to the memory cell array 110 of FIG. 1C.

FIG. 3B is a schematic implementation example of the PUF code generating system with the 3×3 memory cell array. For example, in case that the nine memory cells in the memory cell array 110 are in the programmed state, the cell current $I_A$ of the memory cell A is 25.2 μA, the cell current $I_B$ of the memory cell B is 18.3 μA, the cell current $I_C$ of the memory cell C is 20.5 μA, the cell current $I_D$ of the memory cell D is 29.4 μA, the cell current $I_E$ of the memory cell E is 15.8 μA, the cell current $I_F$ of the memory cell F is 26.4 μA, the cell current $I_G$ of the memory cell G is 18.7 μA, the cell current $I_H$ of the memory cell H is 21.0 μA, and the cell current $I_I$ of the memory cell I is 23.6 μA. After the selecting circuit 120 collects the cell currents of all memory cells, an average cell current $I_{AVG}$ of 22.1 μA is calculated. The average cell current $I_{AVG}$ is the average electrical characteristic.

The electrical characteristic of one memory cell and the average electrical characteristic are transmitted from the selecting circuit 120 to the comparing circuit 130. According to the electrical characteristic of the memory cell and the average electrical characteristic, the comparing circuit 130 generates a one-bit PUF code, which is formed as a PUF array.

Please refer to FIG. 3B. Since the cell current $I_A$ is higher than the average cell current $I_{AVG}$, the comparing circuit 130 generates a PUF code "1" and stores this PUF code in the position (1,1) of the PUF array. Similarly, since the cell current $I_B$ is lower than the average cell current $I_{AVG}$, the comparing circuit 130 generates a PUF code "0" and stores this PUF code in the position (1,2) of the PUF array. Similarly, since the cell current $I_C$ is lower than the average cell current $I_{AVG}$, the comparing circuit 130 generates a PUF code "0" and stores this PUF code in the position (1,3) of the PUF array. The rest may be deduced by analogy. After the 9 cell currents are selected by the selecting circuit 120 and inputted into the comparing circuit 130, the comparing circuit 130 generates a 9-bit PUF code. The multi-bit PUF code is stored as the PUF array.

Figure 4A:
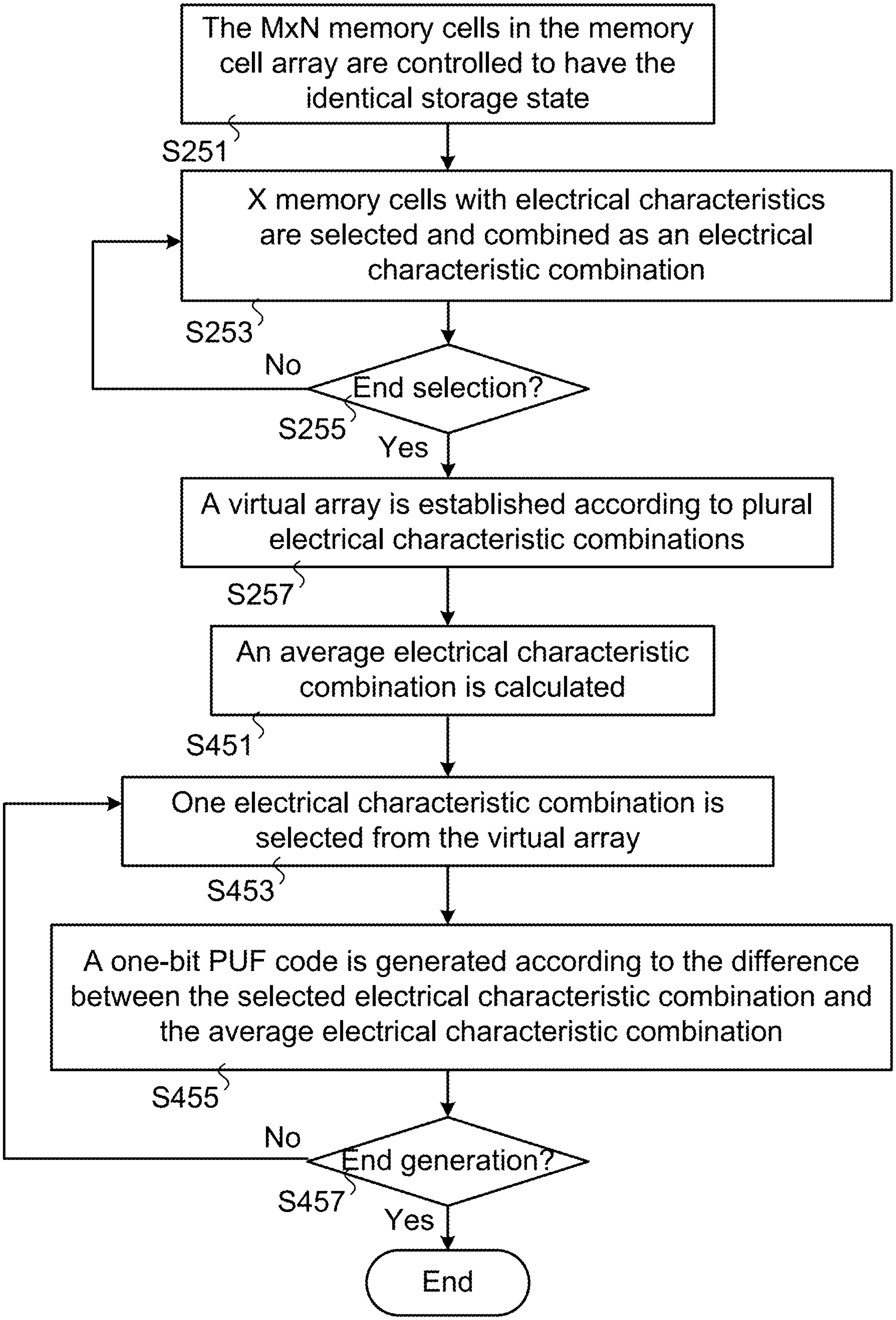
FIG. 4A is a flowchart of another exemplary PUF code generating method for the PUF code generating system according to the second embodiment of the present invention.

FIG. 4A is a flowchart of another exemplary PUF code generating method for the PUF code generating system according to the second embodiment of the present invention. The PUF code generating method of this embodiment is applied to the PUF code generating system 200 shown in FIG. 2A. The architecture of the PUF code generation system 200 will not be redundantly described herein.

Firstly, a step S251 is performed to control the M×N memory cells in the memory cell array 110 to have the identical storage state, wherein M and N are positive integers, and M×N is greater than 1.

Then, X memory cells from the memory cell array 210 are selected and the electrical characteristics of the selected X memory cells are combined as an electrical characteristic combination by the processing circuit 215 (Step S253).

Then, a step S255 is performed to determine whether the procedure of selecting the electrical characteristics is ended. If the judging condition of the step S255 is not satisfied, the step S253 is repeatedly done. If the judging condition of the step S255 is satisfied, the processing circuit 215 establishes a virtual array according to the collected plural electrical characteristic combinations (step S257).

Then, the processing circuit 215 calculates a reference electrical characteristic combination (Step S451). Similarly, the reference electrical characteristic combination can be an average electrical characteristic combination or a median electrical characteristic combination. In S451 and S455 of FIG. 4A, the average electrical characteristic combination will be used as the reference electrical characteristic combination and the present invention will be further explained. Of course, the average electrical characteristic combination may be calculated by the selecting circuit 220.

Then, the selecting circuit 220 selects one electrical characteristic combination from the virtual array 216 (Step S453). In addition, the selected electrical characteristic combination and the average electrical characteristic are transmitted to the comparing circuit 230.

Then, the comparing circuit 230 generates a one-bit PUF code according to the difference between the selected electrical characteristic combination and the average electrical characteristic combination (Step S455).

Then, a step S457 is performed to determine whether the procedure of selecting the electrical characteristics is ended. If the judging condition of the step S457 is not satisfied, the PUF code is generated repeatedly. That is, the step S453 and the step S455 are repeatedly done. In an embodiment, the selecting circuit 220 determines whether the selection is ended. For example, after the selecting circuit 220 collects an enough number of electrical characteristic combinations, the selecting circuit 22 ends the selection, and the comparing circuit 230 generates the PUF code with the enough bits. Alternatively, after the selecting circuit 220 performs the selections for the largest number (Y×Y!) of times, the selecting circuit 220 ends the selection. Consequently, the comparing circuit 230 generates the PUF code with at most (Y×Y!) bits.

In the process of the second embodiment, the operation of the step S455 can be referred to the flowchart of FIG. 1D or FIG. 1E. For example, in case that the discard judgment is not performed, the one-bit PUF code is outputted directly. Alternatively, the discard judgment is performed to determine whether the one-bit PUF code is discarded.

Figure 4B:
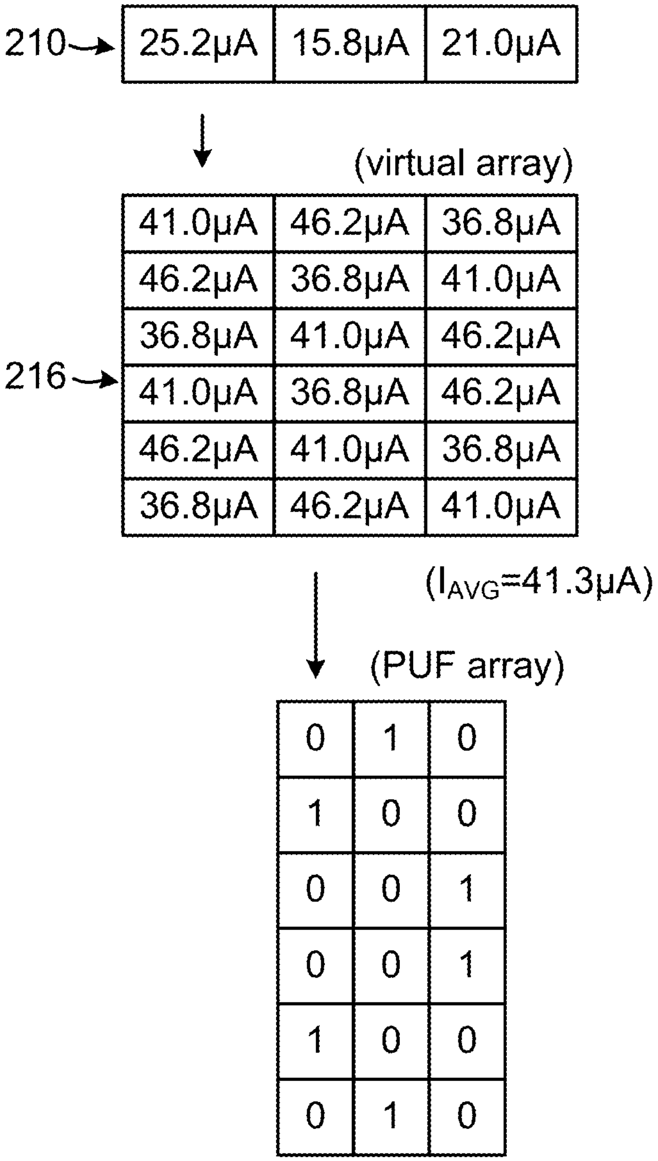
FIG. 4B is a schematic implementation example of the PUF code generating system with the 3×1 memory cell array.

The operations of the PUF code generating method of this embodiment will be illustrated with reference to the memory cell array 210 of FIG. 2C. FIG. 4B is a schematic implementation example of the PUF code generating system with the 3×1 memory cell array.

For example, in case that the three memory cells in the memory cell array 210 are in the programmed state, the cell current $I_A$ of the memory cell A is 25.2 μA, the cell current $I_B$ of the memory cell B is 15.8 μA, and the cell current $I_C$ of the memory cell C is 21.0 μA.

Like the flowchart of the PUF code generating method in the second embodiment, the processing circuit 215 establishes the virtual array 216. Then, an average cell current $I_{AVG}$ of 42.3.1 μA is calculated by the processing circuit 215.

After the selected electrical characteristic combination and the average electrical characteristic combination are transmitted to the comparing circuit 230, the comparing circuit 230 generates a one-bit PUF code according to the difference between the selected electrical characteristic combination and the average electrical characteristic combination.

Please refer to FIG. 4B. The electrical characteristic combination in the position (1,1) of the virtual array 216 is 41.0 μA. Since the electrical characteristic combination is lower than the average electrical characteristic combination (i.e., 41.3 μA), the comparing circuit 230 generates a one-bit PUF code "0" and stores this PUF code in the position (1,1) of the PUF array. The electrical characteristic combination in the position (1,2) of the virtual array 216 is 46.2 μA. Since the electrical characteristic combination is higher than the average electrical characteristic combination (i.e., 41.3 μA), the comparing circuit 230 generates a one-bit PUF code "1" and stores this PUF code in the position (1,2) of the PUF array. The electrical characteristic combination in the position (1,3) of the virtual array 216 is 36.8 μA. Since the electrical characteristic combination is lower than the average electrical characteristic combination (i.e., 41.3 μA), the comparing circuit 230 generates a one-bit PUF code "0" and stores this PUF code in the position (1,3) of the PUF array. The rest may be deduced by analogy. After the 18 electrical characteristic combinations are selected by the selecting circuit 220 and inputted into the comparing circuit 230, the comparing circuit 230 generates a 18-bit PUF code. The multi-bit PUF code is stored as the PUF array.

From the above descriptions, the present invention provides a PUF code generating system and a PUF code generating method. The present invention utilizes a non-volatile memory to form the PUF code generating system. In the non-volatile memory, different memory cells have different electrical characteristics. The selecting circuit can select different electrical characteristics from different memory cells. The comparing circuit determines the PUF code according to the difference between the electrical characteristics.

It is noted that the circuitry structures of the processing circuit, the selecting circuit and the comparing circuit are not restricted. When a computer system is connected with the non-volatile memory, the computer system can be utilized to implement the functions of the processing circuit, the selecting circuit and the comparing circuit and generate the PUF code.

In an embodiment, the circuitry structures of the processing circuit, the selecting circuit and the comparing circuit are designed in a control circuit of an IC chip. When the IC chip is connected with the non-volatile memory, the control circuit can implement the functions of the processing circuit, the selecting circuit and the comparing circuit and generate the PUF code.

Furthermore, the memory cell array can be extended to a transistor array. After the transistors in the transistor array are turned on, different transistors generate different turn-on currents. That is, in the transistor array, the turn-on currents of the transistors may be regarded as the electrical characteristics. Consequently, the transistor array can be applied to the PUF code generating system and the PUF code generating method of the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A physically unclonable function (PUF) code generating method, comprising steps of:

(a) controlling M×N memory cells in a memory cell array of a non-volatile memory to have an identical storage state, wherein M and N are positive integers, and M×N is greater than 1;

(b) selecting two memory cells from the memory cell array;

(c) comparing two electrical characteristics of the two selected memory cells;

(d) generating a one-bit PUF code according to a difference between the two electrical characteristics of the two selected memory cells; and (e) determining whether the step (b) needs to be performed repeatedly, wherein if the step (b) needs to be performed repeatedly, the step (b) is performed again to generate another one-bit PUF code, wherein if the step (b) does not need to be performed repeatedly, the another one-bit PUF code is not generated, wherein the step (b) is performed at most $$P_2^{M \times N}$$

times, and the multi-bit PUF code has at most $$P_2^{M \times N}$$

bits.

2. The PUF code generating method as claimed in claim 1, wherein the step (d) comprises steps of:

(d1) determining the one-bit PUF code according to the difference between the two electrical characteristics of the two selected memory cells;

(d2) judging whether a judging condition is satisfied;

(d3) if the judging condition of the step (d2) is satisfied, discarding the one-bit PUF code, and performing the step (e); and (d4) if the judging condition of the step (d2) is not satisfied, outputting the one-bit PUF code, and performing the step (e).

3. The PUF code generating method as claimed in claim 2, wherein the step (d2) comprises steps of:

(d21) if the difference between the two electrical characteristics is lower than a threshold value, the judging condition is satisfied; and (d22) if the difference between the two electrical characteristics is higher than the threshold value, the judging condition is not satisfied.

4. The PUF code generating method as claimed in claim 2, wherein the step (d2) comprises steps of:

(d21) inputting a first electrical characteristic of the two electrical characteristics into a first input terminal of a comparing circuit, inputting a second electrical characteristic of the two electrical characteristics into a second input terminal of the comparing circuit, and generating a first logic level from an output terminal of the comparing circuit;

(d22) inputting the first electrical characteristic into the second input terminal of the comparing circuit, inputting the second electrical characteristic into the first input terminal of the comparing circuit, and generating a second logic level from the output terminal of the comparing circuit;

(d23) if the first logic level and the second logic level are complementary to each other, the judging condition is not satisfied; and (d24) if the first logic level and the second logic level are identical, the judging condition is satisfied.

5. The PUF code generating method as claimed in claim 1, wherein the electrical characteristic is a cell current generated by one of the memory cells or a charging voltage increment at a sensing node received the cell current in a sensing circuit connected to the memory cell array.

* * * * *